US009613296B1

(12) United States Patent
Rosen et al.

(10) Patent No.: US 9,613,296 B1
(45) Date of Patent: Apr. 4, 2017

(54) SELECTING A SET OF EXEMPLAR IMAGES FOR USE IN AN AUTOMATED IMAGE OBJECT RECOGNITION SYSTEM

(71) Applicant: GumGum, Inc., Santa Monica, CA (US)

(72) Inventors: Daniel Scott Rosen, Thousand Oaks, CA (US); Cambron Neil Carter, Santa Monica, CA (US)

(73) Assignee: GumGum, Inc., Santa Monica, CA (US)

( * ) Notice: Subject to any disclaimer, the term of this patent is extended or adjusted under 35 U.S.C. 154(b) by 51 days.

(21) Appl. No.: 14/877,799

(22) Filed: Oct. 7, 2015

(51) Int. Cl.
*G06K 9/62* (2006.01)
*G06K 9/00* (2006.01)

(52) U.S. Cl.
CPC ......... *G06K 9/623* (2013.01); *G06K 9/00536* (2013.01); *G06K 9/6255* (2013.01); *G06K 9/6257* (2013.01)

(58) Field of Classification Search
CPC .... G06K 9/00536; G06K 9/52; G06K 9/6201; G06K 9/6256; G06T 2207/20081; G06N 99/005; G06N 7/005; G06F 17/3053; G06F 19/24; G06F 17/30598
See application file for complete search history.

(56) References Cited

U.S. PATENT DOCUMENTS

| 2006/0074828 A1* | 4/2006 | Heumann | G06K 9/6217 706/20 |
| 2007/0156615 A1* | 7/2007 | Davar | G06F 17/30713 706/15 |
| 2013/0132311 A1* | 5/2013 | Liu | G06N 99/005 706/12 |

* cited by examiner

*Primary Examiner* — Edward Park
(74) *Attorney, Agent, or Firm* — Knobbe, Martens, Olson & Bear, LLP

(57) ABSTRACT

Systems and methods are provided for identifying a subset of exemplar images in a set of exemplary images that may be used to generate an image classifier having one or more desirable performance characteristics. A computing system may select every possible subset of exemplar images from a set of exemplar images and may generate a classifier for each selected subset of images. The computing system may use each generated classifier to classify one or more images in order to generate performance statistics related to how each classifier performed when classifying the one or more images. The computing system may identify a particular subset of exemplar images that is associated with performance statistics of a classifier that satisfies one or more desired performance characteristics.

20 Claims, 8 Drawing Sheets

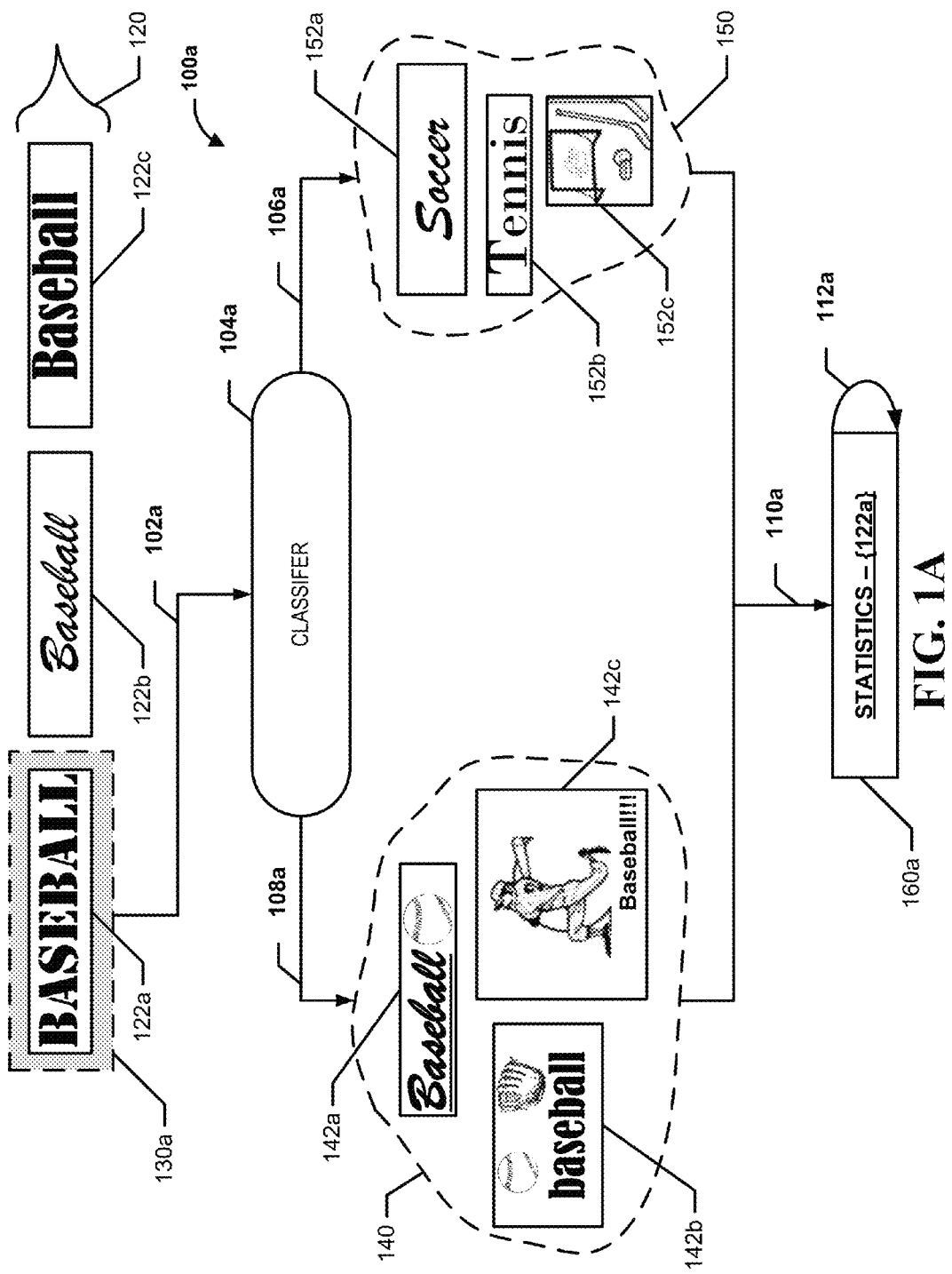

SELECTING A SET OF EXEMPLAR IMAGES FOR USE IN AN AUTOMATED IMAGE OBJECT RECOGNITION SYSTEM

BACKGROUND

Some systems are currently capable of performing object recognition in digital images. Generally, object recognition is a process by which these systems analyze digital images to detect one or more objects that are represented or depicted in those images. Such objects of interest may include a person, an animal, a real-world object, words or text, a location, or some other object of interest.

Increasingly, businesses, governments, and individuals are utilizing systems capable of performing object recognition. One use of object recognition includes categorizing images based on image objects by sorting various images based on the objects depicted in the images. For example, some social media websites rely on object or facial recognition to detect human faces in images uploaded by users of the social media websites in order to determine an identity of the persons depicted in the images and to organize images based on the identities of the persons included in those images. In general, many object recognition systems are trained to detect a given object of interest in new images based in part by receiving an indication that one or more existing images include the object of interest.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 1A-1C are component diagrams that each illustrate a process for generating a classifier using a subset of exemplar images and determining performance statistics related to use of the classifier to identify image objects, according to some embodiments.

DETAILED DESCRIPTION

Figure 1B:
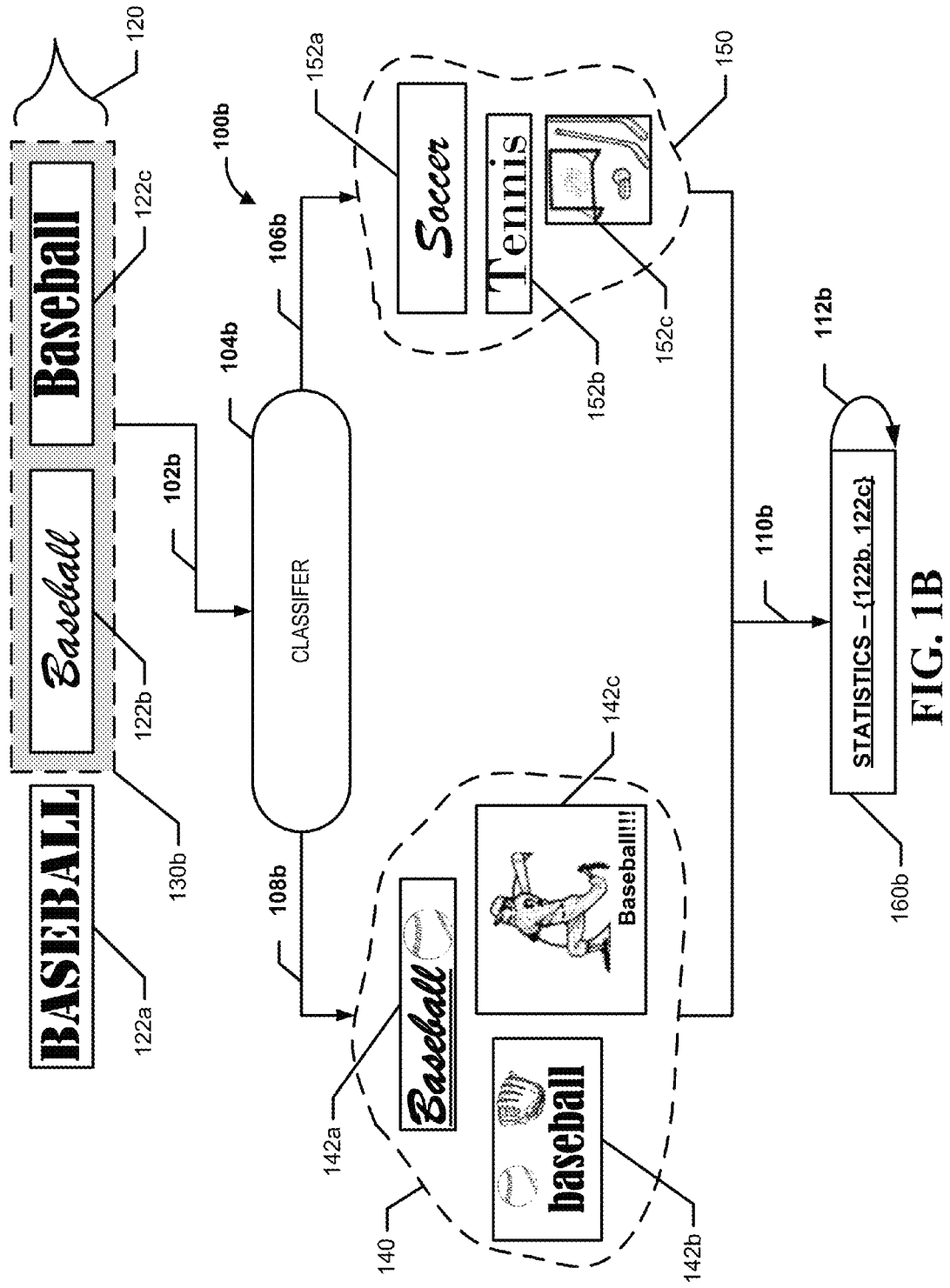

Computing systems capable of performing object recognition often rely on classifiers (sometimes also referred to as "models" or "classifier models"). Classifiers are often probabilistic models that are created or generated using machine learning techniques. In the context of object recognition in digital images, classifiers may be used to determine a likelihood that a particular image object (e.g., a visual representation of an object) is included or depicted in an image.

As described herein, a "target image object" refers to an image object that is the subject of a classifier that has been created or trained to identify that particular image object. For example, a target image object may be a visual representation of a company's logo, and a classifier may be generated specifically to identify at least that logo. In some embodiments, the target image object may generally refer to a class or group of related image objects that may be identified using a particular classifier. In the above example, the target image object may be related to any of one or more different styles or versions of the same logo of the company (e.g., logos of the company from different decades), and the classifier may be trained or created to identify one or more (or all) of those different logos.

Classifiers described herein as being configured to identify a target image object are created or trained using exemplar images that are known to include that target image object. Specifically, in creating or training a model, each exemplar image is processed to identify features of the image. These features are usually some measurable property or characteristic of the target image object. Examples of types of features used in object recognition include scale-invariant feature transform (SIFT) features and speeded-up-robust features (SURF). Because the exemplar images are known to include the target image object, the features of the exemplar images are then associated with a probability of indicating that the target image object is included in the image. For example, if most or all of the exemplar images includes a certain feature, the presence of that feature in another, unclassified image may indicate a high likelihood that the unclassified image includes the target image object. Further, the absence of that feature in an unclassified image may indicate a lower likelihood that that unclassified image includes the target image object.

When creating or training a classifier, human operators typically select exemplar images that they believe best represent a target image object in the hopes that the resulting classifier will exhibit desired performance characteristics (e.g., accurate classification determinations, fast classifications, etc.). However, creating a classifier with a desired performance is often difficult because it is often unknown how a given combination of exemplar images used to generate or train a classifier will affect that classifier's performance characteristics before that classifier is created/trained. For example, a first classifier created with a first combination of twenty exemplar images may classify images with a high rate of true positives and a high rate of false positives. However, a second classifier created with a second combination of twenty exemplar images may classify images with a high rate of true positives and a low rate of false positives.

In a suboptimal solution, a few subsets of exemplar images may be manually selected and used to create classifiers. However, as the effect of the exemplar images on the performance characteristics of the classifier is typically unknown, manually selecting these subsets may result in classifiers having unpredictable or undesirable performance characteristics.

In overview, aspects of the present disclosure include systems and methods for identifying a subset of exemplar images in a set of exemplary images that may be used to generate a classifier having one or more desirable performance characteristics. Specifically, in some embodiments, a computing system may execute an image subset selector to select every possible subset of exemplar images from a set of exemplar images and to generate a classifier for each selected subset of images. The image subset selector may use each generated classifier to classify one or more images in at least one of a set of recall images and a set of false-alarm images. The image subset selector may further generate performance statistics related to how each classifier performed when classifying the one or more images in one or both of the sets of recall and false-alarm images. In some embodiments, the image subset selector may identify a particular subset of exemplar images that is associated with performance statistics of a classifier that satisfies one or more desired performance characteristics. The image subset selector may then output the identities of the images in the identified subset of exemplar images (e.g., as file names).

In various embodiments, the set of exemplary images may include one or more images that may only include one or more target image objects. In a non-limiting example, a target image object may be one or more versions of a logo or slogan of a particular company. In another example, a target image object may represent a particular person, a physical good, a location, an activity, or virtually any visual representation of any other object of interest. As noted above, a classifier may be generated or trained using one or more of the exemplary images in order to determine the likelihood that other images include the one or more target image objects.

In some embodiments, the set of recall images may include the one or more target image objects included in the exemplary images, as well as one or more non-target image objects. Specifically, non-target image objects may be representations of objects other than the one or more target image objects. For example, a target image object may be a logo for Company A, whereas a non-target image object may be any other image object that is not the logo for Company A (e.g., a logo for Company B, a person, a product or any other object). In some embodiments, the recall images may be images that depict the target image object in a natural or real world setting, such as a photograph of a person holding a soda can that includes the logo for Company A on the soda can. As described further herein, the set of recall images may be used when determining the performance characteristics of a classifier at least in part by determining the percentage of images in the set of recall images that the classifier accurately detects as having the target image object despite the inclusion of one or more non-target image objects. Various other statistics regarding the performance characteristics of the classifier may also be identified based on the classifications of the set of recall images, such as the percentage of images in the set of recall images that the classifier incorrectly indicated did not include the target image object, the amount of processing time required to classify one or more of the images in the set of recall images, etc.

The set of false-alarm images may only include one or more non-target image objects, and do not include the target image object. In an example in which the target image object is a particular model of a truck, a false-alarm image may include visual representations of objects similar to the target image object, such as boats, airplanes, and tanks, and/or may include visual representations of completely unrelated objects, such as soccer balls, balloons, flowers, etc. In some embodiments, the set of false-alarm images may be used when determining the performance characteristics of a classifier. For example, the computing system may determine the percentages of false positive detections of the target image object in the set of false-alarm images, the amount of time to classify each image in the set of false-alarm images, the average amount of time to classify all of the images, and various other performance statistics.

In some embodiments, the computing system may obtain or receive each of the three individual sets of images. In some instances, a user of the computing system may upload each of the three sets of images to the computing system directly, such as via inserting a flash drive including the sets of images into the computing system. In some embodiments, the computing system may obtain the three sets of images via a network connection, for example, by requesting and downloading the images from a web site or from a content delivery network.

The computing system is sometimes described herein as generating a classifier using one or more exemplar images. For ease of description, operations directed to "generating" a classifier may include creating a new classifier or training/modifying an existing classifier (e.g., training a pre-existing general model).

Figure 1C:
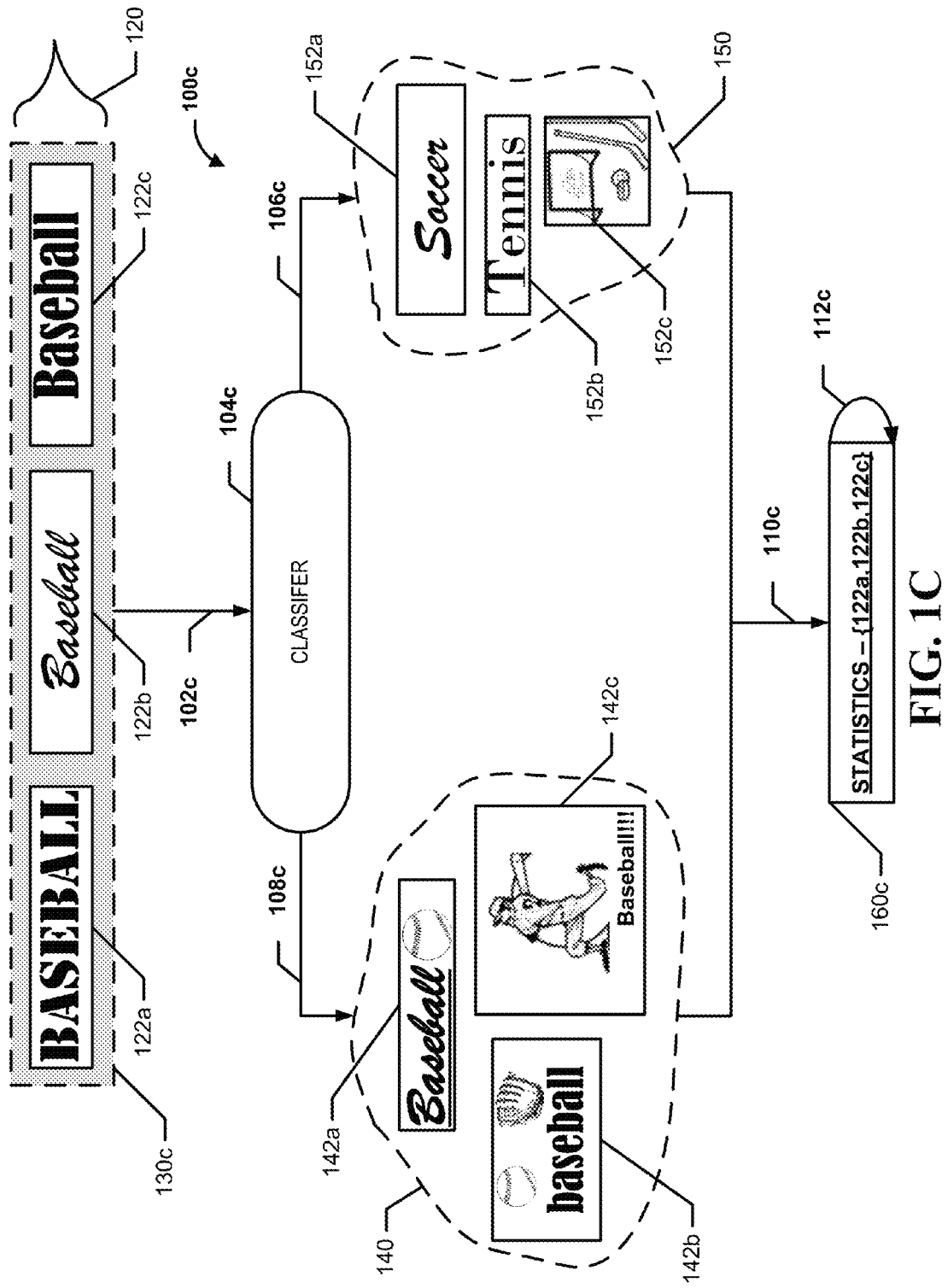

FIGS. 1A-1C illustrates component diagrams representing example processes 100a-c implemented on a computing system for creating classifiers based on different subsets of exemplar images and generating performance statistics associated with the use of these classifiers to classify images, according to some embodiments.

The computing system may store, obtain, or otherwise have access to a set of exemplar images 120, a set of recall images 140, and a set of false-alarm images 150. Each of the sets of images 120, 140, and 150 would typically include two or more images. In the examples illustrated in FIGS. 1A-1C, the set of exemplar images 120 may include three distinct images 122a-c that each only includes a target image object. As described with reference to the examples illustrated in FIGS. 1A-C, the target image object may be a logo featuring the word "Baseball." While three exemplar images are illustrated in FIGS. 1A-1C for ease of description and for illustrative purposes, it will be appreciated that the set of exemplar images may include many more images in other embodiments. Similarly, a significantly larger number than three images would typically be included in the set of recall images 140 and the set of false-alarm images 150.

In a non-limiting example, the set of exemplar images 120 may include three images that include different visual representations or "versions" of the logo "Baseball." In particular, the exemplar image 122a may include a stylized version of the logo "Baseball" in which "Baseball" is styled in all block, capital letters. The exemplar image 122b may include a different version of the logo "Baseball" in which "Baseball" is styled in cursive letters. The exemplar image 122c may include yet another version of the logo "Baseball," in which "Baseball" is not in cursive and starts with a capital letter. While three versions of the logo "Baseball" are illustrated, the set of exemplar images 120 may include one or more separate images having different versions of the logo "Baseball." While the illustrative logos in exemplar images 120 consist of text represented in stylized letters, in other embodiments, the logos may consist entirely of graphical content that does not include depiction of any text.

The set of recall images 140 may include one or more images that include the target image object (e.g., the logo "Baseball"), as well as at least one other image object. In some embodiments described further herein, the computing system may use a classifier generated or trained using a certain subset of exemplar images to classify one or more images in the set of recall images 140. Based on the results of these classifications, the computing system may determine various performance characteristics related to the classifier, such as how often the classifier incorrectly indicated that an image in the set of recall images 140 did not include the target image object (e.g., the logo "Baseball") or how often the classifier correctly indicated that an image in the set of recall images 140 did include the target image object.

In the non-limiting examples illustrated in FIGS. 1A-1C, the set of recall images 140 may include recall images 142a-c. The recall image 142a may include a version of the logo "Baseball" and may further include a visual representation of a baseball. In particular, the visual representation of the baseball in the recall image 142a may be considered a non-target image object because the visual representation of a baseball may differ from the visual representation of the logo "Baseball." The recall image 142b may include a version of the logo "Baseball," in addition to the non-target image objects related to a visual representation of a baseball and a visual representation of a baseball glove. The recall image 142c may also include a visual representation of the logo "Baseball" and may also include a non-target image object related to a visual representation of a person in a baseball uniform swinging a baseball bat. In some embodiments, the set of recall images 140 may include versions of the target image object that are not included in the set of exemplar images 120.

The set of false-alarm images 150 may include one or more images that include one or more non-target image objects but do not include any version of the target image object (e.g., the logo "Baseball"). In some embodiments, the computing system may use a classifier generated using a certain subset of exemplar images to classify one or more images in the set of false-alarm images 150. Based on the results of these classifications, the computing system may determine various performance characteristics related to the classifier, such as how often the classifier incorrectly indicated that an image in the set of false-alarm images 150 included the target image object (e.g., the logo "Baseball") or how often the classifier correctly indicated that an image in the set of false-alarm images 150 did not include the target image object.

In the non-limiting examples illustrated in FIGS. 1A-1C, the set of false-alarm images 150 may include false-alarm images 152a-c. The false-alarm image 152a may only include a logo "Soccer." The false-alarm image 152b may include another logo "Tennis." The false-alarm image 152c may include a visual representation of hockey sticks, hockey pucks, and a hockey goal. In these examples, the false-alarm images 152a-c do not include any version of the logo "Baseball."

With reference to the process 100a, the computing system may select a subset of images 130a from the set of exemplar images 120, in operation 102a. In this example, the subset of images 130a may only include the exemplar image 122a. In operation 104a, the computing system may generate or train a classifier for use in identifying the logo "Baseball" (including different versions of the logo "Baseball") in other images. In some embodiments, the computing system may process the subset of exemplar images 130a by identifying features for each image in the subset of exemplar images 130a (e.g., the exemplar image 122a). For example, the computing system may determine or recognize SIFT features of the exemplar image 122a and may represent those features numerically in the form of feature vectors, decision trees, boosted decision stumps, or one or more other probabilistic models. One of ordinary skill in the art will appreciate that one or more different types of known classifiers may be generated using images (e.g., the subset of exemplar images 130a), and the specifics of how the classifier is generated in operation 104a is not a focus of the present disclosure.

Subsequent to generating the classifier in operation 104a, the computing system may classify each image in the set of false-alarm images 150, in operation 106a. In some embodiments, for each of the false-alarm images 152a-c, the computing system may identify features of the false-alarm images 152a-c and may compare those features to the features represented in the classifier in order to determine a probability score or likelihood that each image includes or does not include the target image object (e.g., the logo "Baseball"). For example, the computing system may use the classifier to determine likelihoods that the false-alarm images 152a-c do not include the logo "Baseball." Based on the respective likelihoods, the computing system may correctly determine that the false-alarm images 152a and 152c do not include the logo "Baseball" and may incorrectly determine that the false-alarm image 152b does include the logo "Baseball."

The computing system may use the classifier generated in operation 104a to classify each image in the set of recall images 140, in operation 108a. In some embodiments, the computing system may classify the set of recall images 140 by performing operations similar to those described with reference to operation 106a. For example, the computing system may identify features of the recall images 142a-c and may compare those features to the features represented in the classifier in order to determine a probability score or likelihood that each image includes or does not include the target image object (e.g., the logo "Baseball").

In operation 110a, the computing system may generate performance statistics related to the use of the classifier to classify the images of the set of recall images 140 and/or the images of the set of false-alarm images 150. Specifically, because the set of recall images 140 are known to include the target image object (e.g., the logo "Baseball") and the set of false-alarm images 150 are known not to include the target image object, the computing system may determine statistics related to the accuracy of the classifications of those images using the classifier generated in block 104a. In the example illustrated in FIG. 1A, the computing system using the classifier generated in operation 104a to classify the images of the sets of images 140 and 150 results in a true positive detection rate of 42% and a false positive detection rate of 65%. In some embodiments, the computing system may determine or derive various other performance statistics, such as the average, median, or total amount of time required to classify one or more of the images. For example, the computing system may determine that it took an average of one second to classify each image in the sets of images 140 and 150.

In operation 112a, the computing system may associate the performance statistics generated in operation 110a with the subset of exemplar images 130a that was used to create the classifier in operation 104a. In other words, the computing system may associate the performance statistics regarding the performance characteristics of the classifier with the specific subset of exemplar images that were used to create or train the classifier in the given iteration of the process, prior to beginning a similar iteration with a different subset of exemplar images.

The examples illustrated in FIGS. 1B-C illustrate performance of operations similar to the operations 102a-112a described above for two other subsets of exemplar images. Specifically, in the example illustrated in FIG. 1B, the computing system may select a subset of exemplar images 130b (e.g., the exemplar images 122b-c) in operation 102b. The subset of exemplar images 130b may include a different combination of images than the combination of images included in the subset of exemplar images 130a selected in operation 102a (as described with reference to FIG. 1A). Subsequent to selecting the subset of exemplar images in operation 102b, the computing system may generate another classifier, in operation 104b. The computing system may also classify the set of false-alarm images 150 in operation 106b and may classify the set of recall images in operation 108b. Based on the classifications of these sets of images 140 and 150, the computing system may generate performance statistics related to the use of the classifier to classify these sets of images 140 and 150 in operation 110b. For example, the computing system may determine that the classifier generated in operation 104b had a true-positive detection rate of 78%, a false-positive detection rate of 24%, and an average classification time of 1.6 seconds. Further, in operation 112b, the computing system may associate the performance statistics generated in operation 110b with the subset of exemplar images 130b selected in operation 102b.

In the example illustrated in FIG. 1C, the computing system may select a subset of exemplar images 130c (e.g., the exemplar images 122a-c) in operation 102c. The subset of exemplar images 130c may include a combination of images than differs from the combination of images included in both the subset of exemplar images 130a and the subset of exemplar images 130b (as described, respectively, with reference to FIGS. 1A and 1B). In operation 104c, the computing system may generate another classifier. The computing system may use the classifier generated in operation 104c to classify images of the set of false-alarm images 150 in operation 106c and to classify the images of the set of recall images in operation 108c. Similarly to the operations of the processes 100a-b described above, the computing system may generate performance statistics related to the use of the classifier to classify these sets of images 140 and 150 in operation 110c based on the classifications of these sets of images 140 and 150. In the illustrated example, the computing system may determine that the classifier generated in operation 104c has a true-positive detection rate of 63%, a false-positive detection rate of 35%, and an average classification time of 2.4 seconds. Further, in operation 112c, the computing system may associate the performance statistics generated in operation 110c with the subset of exemplar images 130c selected in operation 102c.

While the examples illustrated in FIGS. 1A-C are related to three examples of subsets of the set of exemplar images 120, the computing system may repeat operations similar to the operations 102a-112a described above with reference to FIG. 1A for each and every non-empty subset of exemplar images in the set of exemplar images 120. In particular, in the examples illustrated in FIGS. 1A-C, the computing system may generate seven classifiers respectively associated with each of the seven non-empty subsets selected from the set of exemplar images 120. For example, the computing system may generate a classifier associated with each image in the set of exemplar images 120.

Further, while the examples illustrated in FIGS. 1A-C are described with reference to a target image object that is related to a logo "Baseball," the description of the target image object as a logo is non-limiting and is merely for use in describing operations performed in various embodiments. Particularly, one of ordinary skill in the art would recognize that the target image object may be related to one or more different versions of any number of image objects and is not limited to logos. For example, the target image object may be related to people, locations, physical objects, text, animation, animals, mascots, or anything else that may be represented visually in an image. Regardless of the characteristics of the target image object, each of the set of exemplar images 120 may only include the target image object, each of the set of recall images 140 may include the target image object in addition to at least one non-target image object, and each of the set of false-alarm images 150 would not include the target image object.

Figure 2:
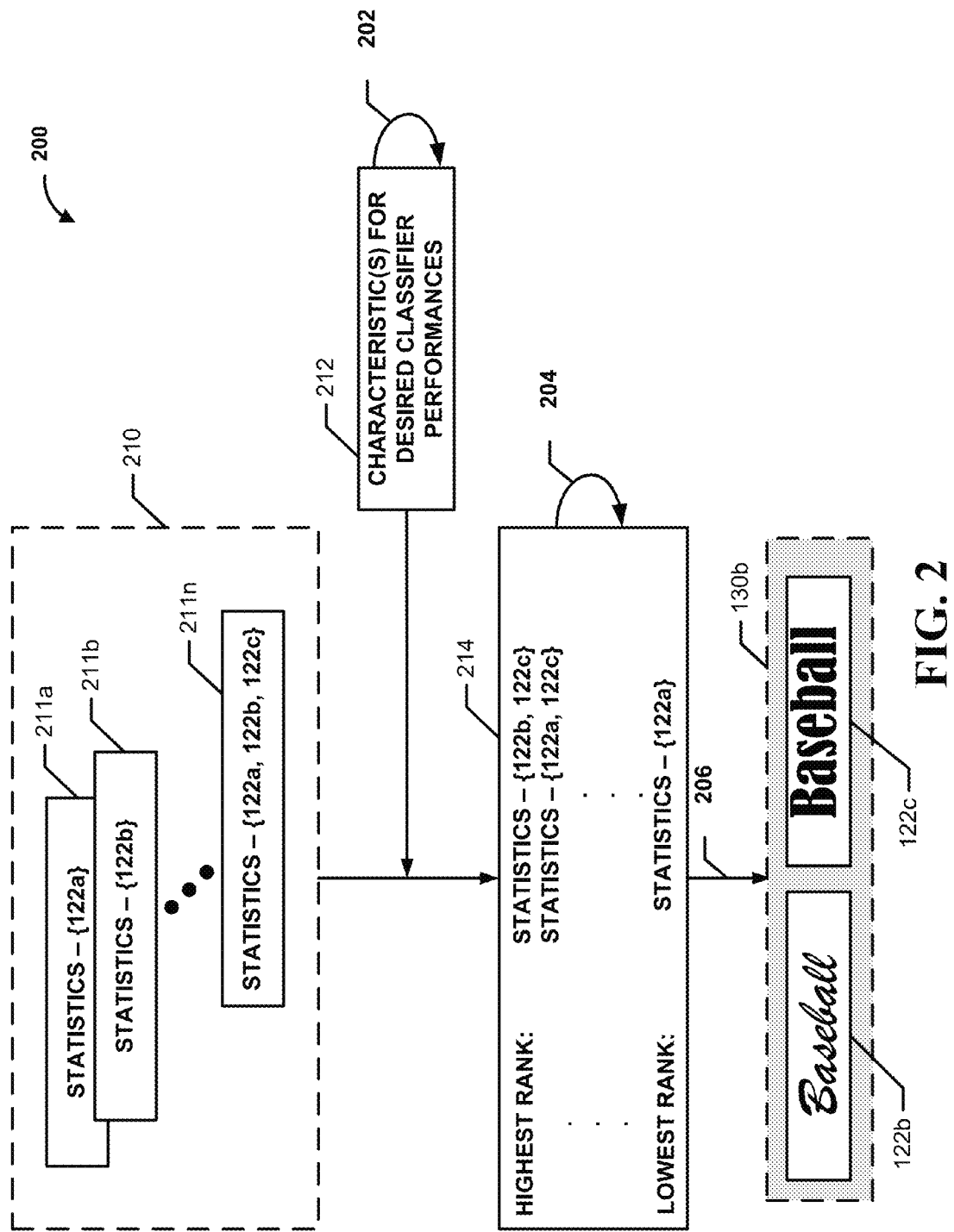
FIG. 2 is a component diagram illustrating a process for identifying a subset of images associated with desired performance characteristics of a classifier from a set of exemplar images, according to some embodiments.

FIG. 2 illustrates a component diagram representing an example process 200 implemented on a computing system for identifying a subset of exemplar images that were used to generate a classifier that is associated with desired performance characteristics, according to some embodiments.

As described (e.g., with reference to FIGS. 1A-C), the computing system may generate statistics related to performance characteristics of classifiers that are generated from each and every non-empty subset of exemplar images 120. In some embodiments, the computing system may collect and store each of these statistics 210 as a group, list, or some other data structure. The group of statistics 210 may include statistics related to each subset of exemplar images, as well as an association between each of the statistics and their respective subset of exemplar images. For example, the group of statistics 210 may include statistics 211a related to the performance of a classifier generated using the exemplar image 122a (see FIG. 1A), statistics 211b related to the performance of classifier generated using the exemplar image 122b, and statistics 211n related to performance of a classifier generated using the exemplar images 122n (see FIG. 1C). For ease of description, the group of statistics 210 is illustrated as having only three statistics 211a-n. However, as indicated by the ellipses illustrated in FIG. 2, the group of statistics includes statistics related to the performance of each classifier generated using each subset of exemplar images.

In operation 202, the computing system may obtain one or more desired performance characteristics 212 related to the performance of a classifier. The computing system may obtain the one or more desired performance characteristics 212 from one or more sources, including from a user or administrator of the computing system or from a remote computing system via a network connection. For example, a user of the computing system may provide user input of the one or more desired performance to the computing system. Alternatively, various users of the computing system may have previously stored desired performance characteristics for certain accounts, campaigns, projects, or classification goals in an electronic data store, and the appropriate stored settings may be retrieved at operation 202.

The one or more desired performance characteristics 212 may be related to various threshold performance metrics of a classifier. In some embodiments, the one or more desired performance characteristics 212 may indicate a preference for classifiers that exhibit one or more of the following performance attributes relative to other classifiers: a higher percentage of true positives, a lower percentage of false positives, a lower percentage of false negatives, a higher percentage of true negatives, a lower amount of time required to classify one or more images, a lower average amount of time required to classify multiple images, and various other metrics related to the use of a classifier to determine whether one or more images include a target image object. One of ordinary skill in the art would appreciate that the one or more desired performance characteristics 212 may include one or more other performance metrics, in addition to or instead of the above examples, that may be useful in measuring, evaluating, and/or comparing the performance, efficiency, or desirability of classifiers used for identifying a target image object.

In operation 204, the computing system may rank the set of performance statistics 210 using the one or more desired performance characteristics 212 received in the operation 202 in order to produce a set of ranked performance statistics 214. In some embodiments, the set of ranked performance statistics 214 may include each of the set of performance statistics 210 and may indicate a ranking for each of the set of performance statistics 210 relative to the one or more desired performance characteristics. For instance, in response to receiving a desired performance characteristic indicating a preference for lower percentages of false positives in operation 202, the computing system may rank the set of performance statistics 210 such that the performance statistics associated with the lowest percentage of false positives is ranked the highest.

In some embodiments, the computing system may obtain priorities associated with each of one or more desired performance characteristics 212. Specifically, in the event that the one or more desired performance characteristics 212 includes multiple desired performance characteristics, each of the desired performance characteristics may be associated with a relative priority. For example, a first desired performance characteristic indicating a preference for higher percentages of true positives may have a higher priority than a second desire performance characteristic indicating a preference for a lower amount of time required to classify an image. In such embodiments, the set of statistics 210 may be ranked in multiple passes based on the priority order of the multiple desired performance characteristics. Thus, in the above example, the set of statistics 210 may be ranked a first time based on the first desired performance characteristics and may be ranked a subsequent time based on the second desired performance characteristic. In some embodiments, the relative priority of desired performance characteristics may be represented by an ordered list of performance characteristics in which a user has arranged the desired performance characteristics in order of importance (e.g., three performance characteristics are respectively assigned priority of "1", "2", and "3"). In other embodiments, the relative priority of desired performance characteristics may be represented more specifically by numeric weightings that have been associated with each desired performance characteristic (e.g., a user may indicate that one performance characteristic that is especially important to the user in a given instance should be given a weight of 2.4, while another performance characteristic that is relatively less important to the user in the given instance should only receive a weight of 0.7).

In some embodiments, the one or more desired performance characteristics 212 may include thresholds for one or more performance metrics (e.g., percentage of false positive, percentage of true negative, etc.), and the computing system may rank the set of statistics 210 in operation 204 by ranking statistics that satisfy the threshold above statistics that do not satisfy the threshold. As described, the computing system may perform successive rankings for multiple desired performance characteristics indicating threshold performance metrics. For example, the computing system may perform a first ranking of the set of statistics 210 based on a threshold percentage of true positives, followed by a second ranking of the set of statistics 210 based on an amount of time required to classify an image. In this example, statistics that satisfy both thresholds may be ranked higher than statistics that satisfy the first threshold but not the second threshold, which may in turn, be ranked higher than statistics that only satisfy the second threshold or neither of the thresholds.

In operation 206, the computing system may identify the subset of the set of exemplar images associated with the highest ranking statistics in the set of ranked statistics 214 based on the one or more desired performance characteristics 212. In some embodiments in which multiple statistics are ranked as the highest, the computing system may perform one of various tie breakers. For example, the computing system may select the subset of exemplar images that includes the fewest number of images.

By identifying the subset of exemplar images in operation 206, the computing system may determine the exact subset of exemplar images from the set of exemplar images 120 that may be used to create a classifier that best satisfies the desired performance characteristics 212. Thus, in the example illustrated in FIG. 2, the computing system may determine that the subset of exemplar images 130b best satisfies the desired performance characteristics 212 as that subset of exemplar images 130b is associated with statistics having the highest rank in the set of ranked performance statistics 214.

Figure 3:
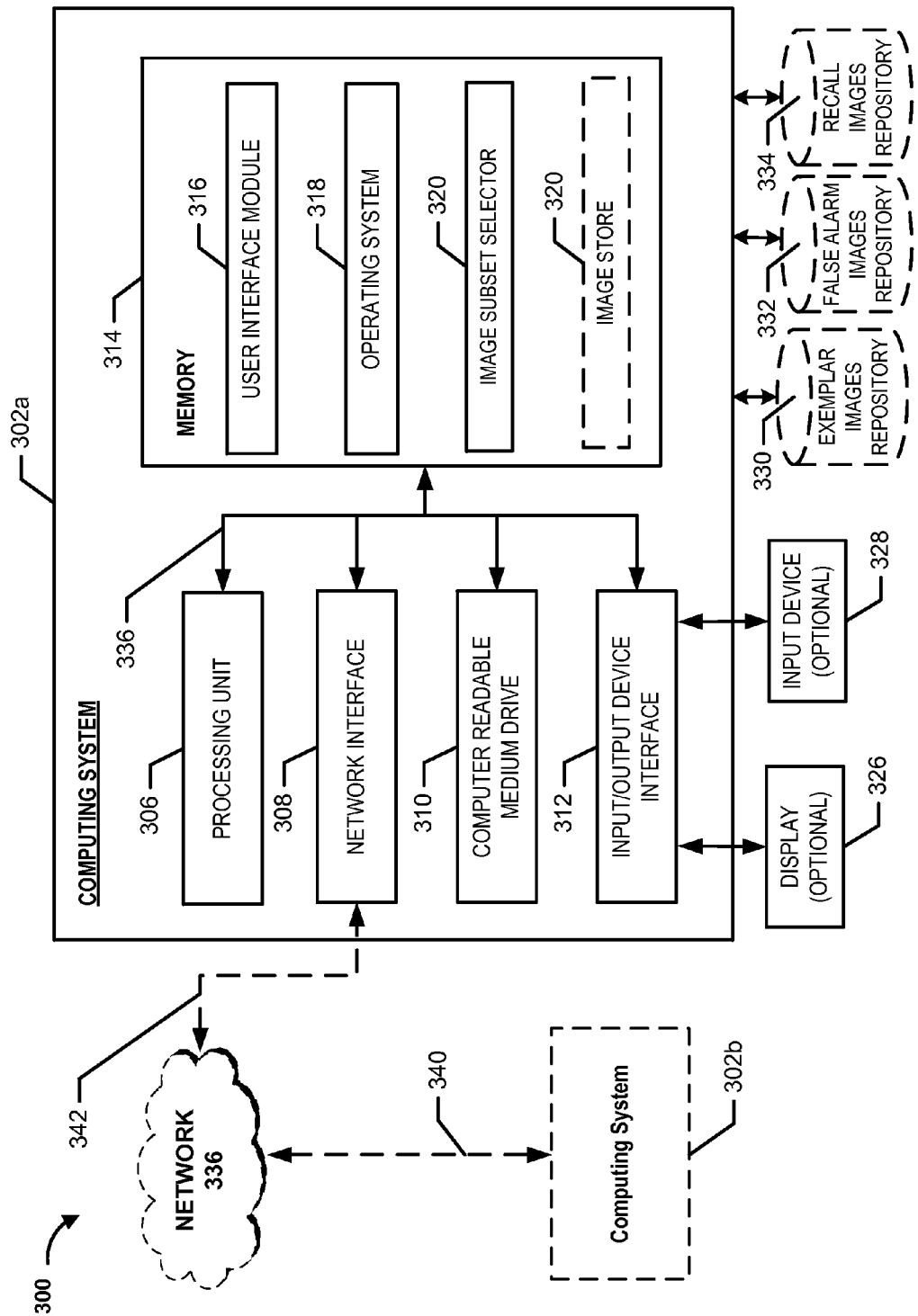
FIG. 3 is a communication system block diagram of a computing environment suitable for use in various embodiments of the present disclosure.

FIG. 3 illustrates a general architecture of a computing environment 300, according to some embodiments. As depicted in FIG. 3, the computing environment 300 may include a computing system 302a. The general architecture of the computing system 302a may include an arrangement of computer hardware and software components used to implement aspects of the present disclosure. The computing system 302a may include many more (or fewer) elements than those shown in FIG. 3. It is not necessary, however, that all of these generally conventional elements be shown in order to provide an enabling disclosure.

As illustrated, the computing system 302a includes a processing unit 306, a network interface 308, a computer readable medium drive 310, an input/output device interface 312, an optional display 326, and an optional input device 328, all of which may communicate with one another by way of a communication bus 336. The processing unit 306 may communicate to and from memory 314 and may provide output information for the optional display 326 via the input/output device interface 312. The input/output device interface 312 may also accept input from the optional input device 328, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device known in the art.

The memory 314 may contain computer program instructions (grouped as modules or components in some embodiments) that the processing unit 306 may execute in order to implement one or more embodiments described herein. The memory 314 may generally include RAM, ROM and/or other persistent, auxiliary or non-transitory computer-readable media. The memory 314 may store an operating system 318 that provides computer program instructions for use by the processing unit 306 in the general administration and operation of the computing system 302a. The memory 314 may further include computer program instructions and other information for implementing aspects of the present disclosure. For example, in one embodiment, the memory 314 may include a user interface module 316 that generates user interfaces (and/or instructions therefor) for display upon a computing system, e.g., via a navigation interface such as a browser or application installed on the computing system.

In some embodiments, the memory 314 may include an image subset selector 320, which may be executed by the processing unit 306 to perform operations according to various embodiments described herein (e.g., the operations described with reference to FIGS. 1A-C, 2, 4A, 4B and 5). For example, the image subset selector 320 may obtain a set of exemplar images, a set of recall images, and a set of false-alarm images. These sets of images may be stored locally on the computing system 302a in an optional image store 320, or the image subset selector 320 may optionally receive the sets of images from external sources, such as from an exemplar images repository 330, a false-alarm images repository 332, and a recall images repository 334 (all three of which may be stored within a single data store in other embodiments). For each subset of images in the set of exemplar images, the image subset selector 320 may generate a classifier, use that classifier to classify the images in the set of recall images and the set of false-alarm images, and generate statistics regarding the performance of that classifier. The image subset selector 320 may further obtain one or more desired performance characteristics (e.g., via the optional input device 328 or from a data store) and may select a particular subset of exemplar images associated with a classifier that has performance statistics that best satisfy one or more desired performance characteristics.

While the image subset selector 320 is illustrated in FIG. 3 as a separate module stored in the memory 314, in some embodiments, the image subset selector 320 may be included and/or implemented in the operating system 318, and as such, a separate image subset selector 320 may not be required to implement various embodiments.

In some embodiments, the network interface 308 may provide connectivity to one or more networks or computing systems, and the processing unit 306 may receive information and instructions from other computing systems or services via one or more networks. In the example illustrated in FIG. 3, the network interface 308 may be in communication with a computing system 302b via the network 336. In particular, the computing system 302a may establish a communication link 342 with a network 336 (e.g., using known protocols) in order to send communications to the computing system 302b over the network 336. Similarly, the computing system 302b may send communications to the computing system 302a over the network 336 via a wired or wireless communication link 340.

In embodiments in which the computing system 302a is in communication with one or more other computing systems via a network (e.g., the computing system 302b), the image subset selector 320 may receive the set of exemplar images, the set of false-alarm images, and/or the set of recall images from the computing system 302b. For example, the computing system 302b may be a content provider that stores various types of images for use in generating classifiers, and the image subset selector 320 may request and receive images suitable for use in the three different sets from the computing system 302b.

Further, in some embodiments, the above description of the computing system 302a may also be applied to the computing system 302b. As such, the computing system 302b may include the components discussed above with reference to the computing system 302a and may be configured to perform operations described with reference to the various embodiments. In such embodiments, the operations described with reference to the various embodiments may be performed in part by the image subset selector 320 operating on the computing system 302a, as well as another image subset selector (not shown) operating on the computing system 302b. For example, the image subset selector 320 may send each subset of exemplar images to the computing system 302b. The computing system 302b may generate a classifier for each subset of exemplar images and may send the classifier to the image subset selector 320. In response, the image subset selector 320 may utilize the received classifiers to classify images of the set of recall images and the set of false-alarm images and may rank the corresponding performance statistics of the received classifiers to select a subset of exemplar images, without having to have generated the classifier. In addition, or alternatively, to the above example, one of ordinary skill in the art would appreciate that one or more of the operations described in the various embodiments may be performed on one or more computing systems in communication with each other.

Further those skilled in the art will recognize that the computing systems 302a and 302b may be any of a number of computing systems including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and the like.

Figure 4A:
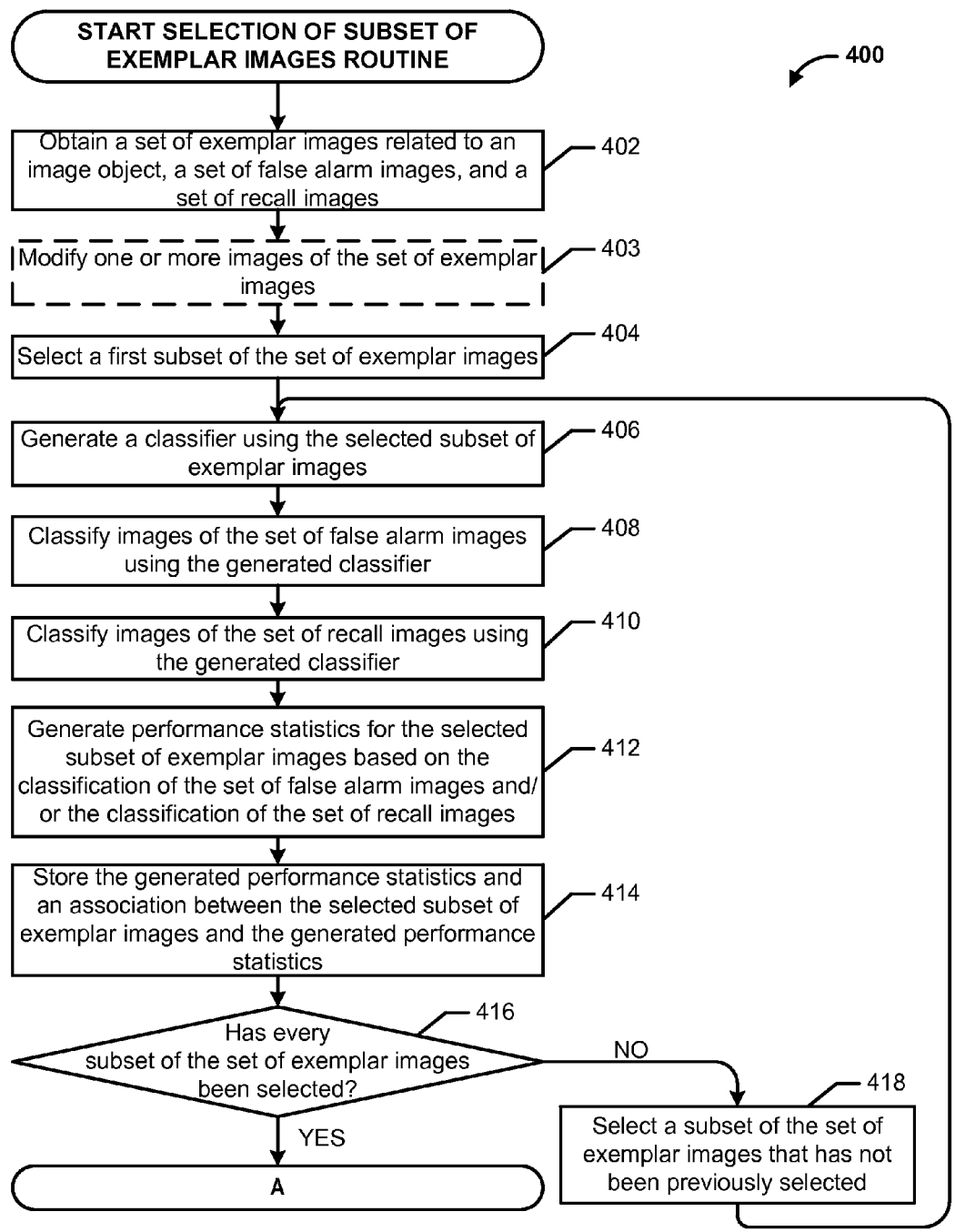
FIGS. 4A and 4B are process flow diagrams illustrating a method for generating a classifier based on each subset of a set of exemplar images and generating performance statistics for each of the generated classifiers, according to some embodiments.
Figure 4B:
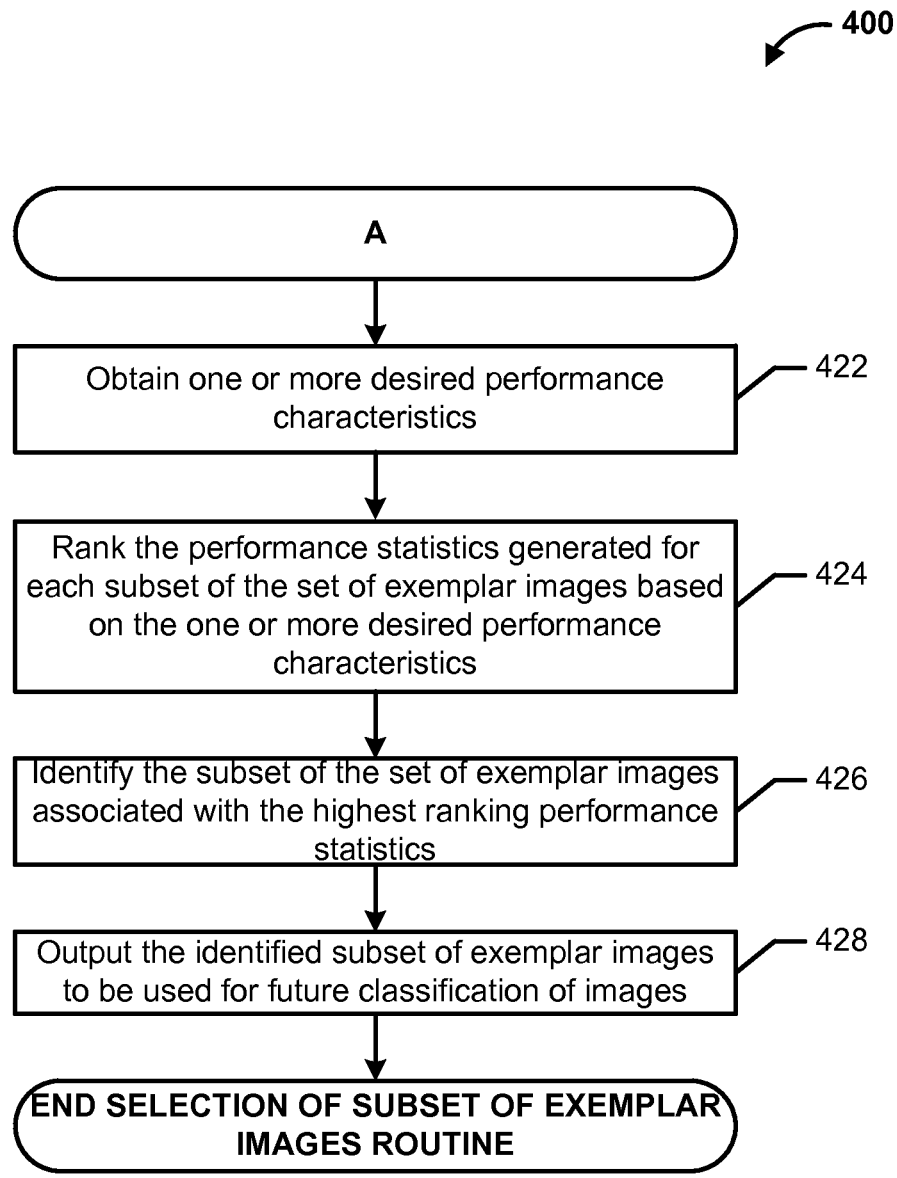

FIGS. 4A-4B are process flow diagrams of an illustrative routine 400 for identifying a subset of exemplar images that can be used to generate a classifier that satisfies one or more desired performance characteristics, according to various embodiments. In some embodiments, the routine 400 may be implemented by a processor executing an image subset selector 320 on a computing system (e.g., the image subset selector 320 of the computing system 302a as described with reference to FIG. 3).

With reference to FIG. 4A, the image subset selector 320 may obtain a set of exemplar images related to a target image object, in block 402. The image subset selector 320 may similarly obtain a set of false-alarm images and a set of recall images. In some embodiments, these sets of images may have previously been stored in memory on the computing system or be accessible from a local or remote data store. Additionally, or alternatively, the image subset selector 320 may receive the sets of images from a remote computing system (e.g., the computing system 302b). Each false-alarm image may be an image that a human has previously confirmed does not include the target image object within the image, while each recall image may be an image that a human has previously confirmed does include the target image object within the image.

In optional block 403, the image subset selector 320 may modify one or more images of the set of exemplars to reduce the overall amount of time required to classify images with a classifier generated or trained with one or more of those exemplar images. In some embodiments of the operations performed in optional block 403, the image subset selector 320 may utilize or generate a classifier to determine the baseline statistics associated with each of the unmodified images in the set of exemplar images. For example, the image subset selector 320 may train the classifier using an unmodified exemplar image to determine baseline statistics related to the percentage of false/true positives/negatives associated with that unmodified exemplar image. The image subset selector 320 may determine other performance indicators, such as how quickly the classifier is able to generate those determinations using that unmodified exemplar image.

Once the image subset selector 320 has determined the baseline statistics for each of the unmodified images in the set of exemplar images, the image subset selector 320 may begin making adjustments or modifications to each unmodified image in the set of exemplar images to reduce the amount of time needed to perform classifications based on the unmodified exemplar images. In some embodiments, for each exemplar image, the image subset selector 320 may reduce the number of features included or depicted in that exemplar image, for example, by applying one or more low-pass filters on the exemplar image. However, in some embodiments, the image subset selector 320 may also (or alternatively) perform one or more other operations to filter or alter the images. For example, the image subset selector 320 may also perform one or more of a high-pass filter operation, a band-pass filter operation, a color-space transformation operation (e.g., from the Red-Green-Blue color space to the Luma-Chroma or "YCbCr" color space), an affine or a projective transformation operation, a resizing operation, a cropping operation, and the like.

After making a modification to the exemplar image, the image subset selector 320 may determine statistics associated with use of the modified exemplar image to classify images. The image subset selector 320 may compare the baseline statistics of the unmodified exemplar image with the statistics of the modified exemplar image, and the image subset selector 320 may continue modifying the exemplar image (e.g., by performing additional low-pass filter operations) until the statistics of the exemplar image resulting from the most recent modification do not reduce the amount of time needed to perform classifications with the modified exemplar image or until the most recent modification negatively affect the classifier's accuracy (e.g., a higher percentage of false positives).

By modifying the one or more images as described above, the image subset selector 320 may produce a modified set of exemplar images that is associated with statistics that are as good or better than the baseline statistics of the unmodified set of exemplars. Further, because the modified set of exemplar images have reduced complexity in comparison to the unmodified set of exemplars, a classifier may use one or more of the modified exemplar images to classify images faster than by using corresponding unmodified exemplar images.

For ease of description, the following operations described with reference to the routine 400 do not distinguish between modified or unmodified exemplar images. However, it may be understood that the following descriptions may refer to either modified or unmodified exemplar images depending on whether the image subset selector 320 modifies one or more images of the set of exemplar images in optional block 403.

In block 404, the image subset selector 320 may select a first subset of the set of exemplar images. The image subset selector 320 may then use the subset of exemplar images selected in block 404 to generate a classifier in block 406. As described above, each of the images in the selected subset of exemplar images are known to include only the target image object. Thus, the image subset selector 320 may use the images in the selected subset of exemplar images to create or train a classifier that is suitable for use in determining whether other images include or do not include the target image object.

In some embodiments of the operations performed in block 406, the image subset selector 320 may generate the classifier by identifying one or more features for each image in the selected subset. The image subset selector 320 may then generate a composite of the one or more features for each image in order to generate a composite classifier. In such embodiments, the composite classifier may be created, generated, or trained using a "blend" of features from each of the images in the subset of exemplar images. For example, a first feature in a first image in the selected subset may be used to adjust, correct, or supplement a feature in a second image in the selected subset, thereby resulting in a single composite feature used to generate the composite classifier.

The image subset selector 320 may use the classifier generated in block 406 to classify images of the set of false-alarm images in block 408 and to classify images of the set of recall images in block 410. In other words, the image subset selector 320 may utilize the generated classifier to determine whether the images in the set of false-alarm images and the images in the set of recall images include the target image object. Specifically, in some embodiments, the classifier may return a certain probability that an image includes the target image object, and the image subset selector 320 may deem those images associated with a probability that satisfies a certain threshold likelihood (e.g., 75%) as including the target image object. On the other hand, the image subset selector 320 may deem images associated with a probability or likelihood that does not satisfy the threshold likelihood as not including the target image object. The image subset selector 320 may alternatively classify the images based on a threshold likelihood that the images do not include the target image object.

In block 412, the image subset selector 320 may generate performance statistics for the selected subset of exemplar images based on the classification of the images of the set of false-alarm images in block 408 and/or based on the classification of the images of the set of recall images in block 410. In particular, because the images in the set of false-alarm images are known not to include the target image object, the image subset selector 320 may determine various performance characteristics of the generated classifier based on how well (or poorly) the classifier determined that the images in the set of false-alarm images did not include the target image object. For example, a relatively large number of classifications indicating that images in the set of false-alarm images included the target image object may indicate a high percentage of false positives. Similarly, the image subset selector 320 may determine additional performance statistics related to the classification of the images in the set of recall images, which are known to include the target image object (in addition to at least one non-target image object). In some embodiments, the image subset selector 320 may also or alternatively determine other performance statistics regarding the use of the generated classifier to classify the images in blocks 408 and 410, such as the average amount of time that was required for the classifier to make a classification of one or more images.

The image subset selector 320 may store the generated performance statistics, as well as an association between the generated performance statistics and the selected subset of exemplar images, in block 414. For example, the image subset selector 320 may store the generated performance statistics and the association with the selected subset of exemplar images in the memory 314 or an electronic data store. In some embodiments, the image subset selector 320 may store the performance statistics and association in a list, look-up table, or some other data structure.

In determination block 416, the image subset selector 320 may determine whether every subset of the set of exemplar images has been selected. As described, the image subset selector 320 may select each and every subset of exemplar images in order to generate performance statistics related to classifiers for every subset of exemplar images. Thus, in response to determining that every subset of exemplar images has not been selected (i.e., determination block 416="NO"), the image subset selector 320 may select a subset of the set of exemplar images that has not been previously selected, in block 418. The image subset selector 320 may then repeat the above operations in a loop by generating a classifier in block 406 using the subset of exemplar images selected in block 418. In some embodiments, the number of images in the set of false-alarm images and the set of recall images is fixed or remains the same for each iteration of the loop to ensure that the performance statistics generated in block 412 are based on classifications of the same images in those sets of images.

The image subset selector 320 may continue performing the operations in block 406-418 in a loop until the image subset selector 320 determines that every subset of the set of exemplar images has been selected (i.e., determination block 416="YES"), at which point the image subset selector 320 may continue performing the operations in the routine 400 as described with reference to FIG. 4B.

With reference to FIG. 4B, the image subset selector 320 may obtain one or more desired performance characteristics related to the performance of a classifier, in block 422. For example, the one or more desired performance characteristics may indicate a threshold of true positives that a classifier is expected to meet. In some embodiments, the image subset selector 320 may obtain the one or more desired performance characteristics from a user of the computing system 302a as user input, from a remote computing system (e.g., the computing system 302b), as a value preloaded on the computing system 302a by an original equipment manufacturer, or from various other sources.

In block 424, the image subset selector 320 may rank the performance statistics generated for each subset of the set of exemplar images based on the one or more desired performance characteristics obtained in block 422. In some embodiments of the operations performed in block 424, the image subset selector 320 may perform operations similar to those operations described with reference to operation 204 of the process 200 (see FIG. 2).

The image subset selector 320 may identify the subset of exemplar images that is associated with the highest ranking performance statistics, in block 426, and the image subset selector 320 may output the identified subset of exemplar images to be used for future classification of images, in block 428. For example, in the event that the performance statistics are ranked based on the highest percentage of true positives, the image subset selector 320 may identify the subset of exemplar images associated with the performance statistics with the highest rate of true positives. In this example, the image subset selector 320 may then display or output these images or file names associated with the images in the identified subset of exemplar images to the user of the computing system 302a. In another embodiment in which computing efficiency is weighted more heavily among desired performance characteristic settings, a subset of exemplar images that results in relatively fast classification of images with a slightly lower true positive rate may be selected over a subset of exemplar images that results in a higher true positive rate at the cost of significantly lower average per-image analysis time.

In some embodiments, the image subset selector 320 may save an indication of the subset of exemplars that are associated with the desired performance characteristics for quick identification and recall at a later time. For example, after identifying a subset of exemplar images as having the lowest rate of false positives, the image subset selector 320 may save an indication of this subset in order to quickly identify these images without having to perform the above operations a second time. This selected subset of exemplar images may then be used on a potentially much larger scale for classifying images in third-party repositories, from Internet sources (such as from social media networks), and/or from other sources.

The image subset selector 320 may then cease performing operations of the routine 400.

Figure 5:
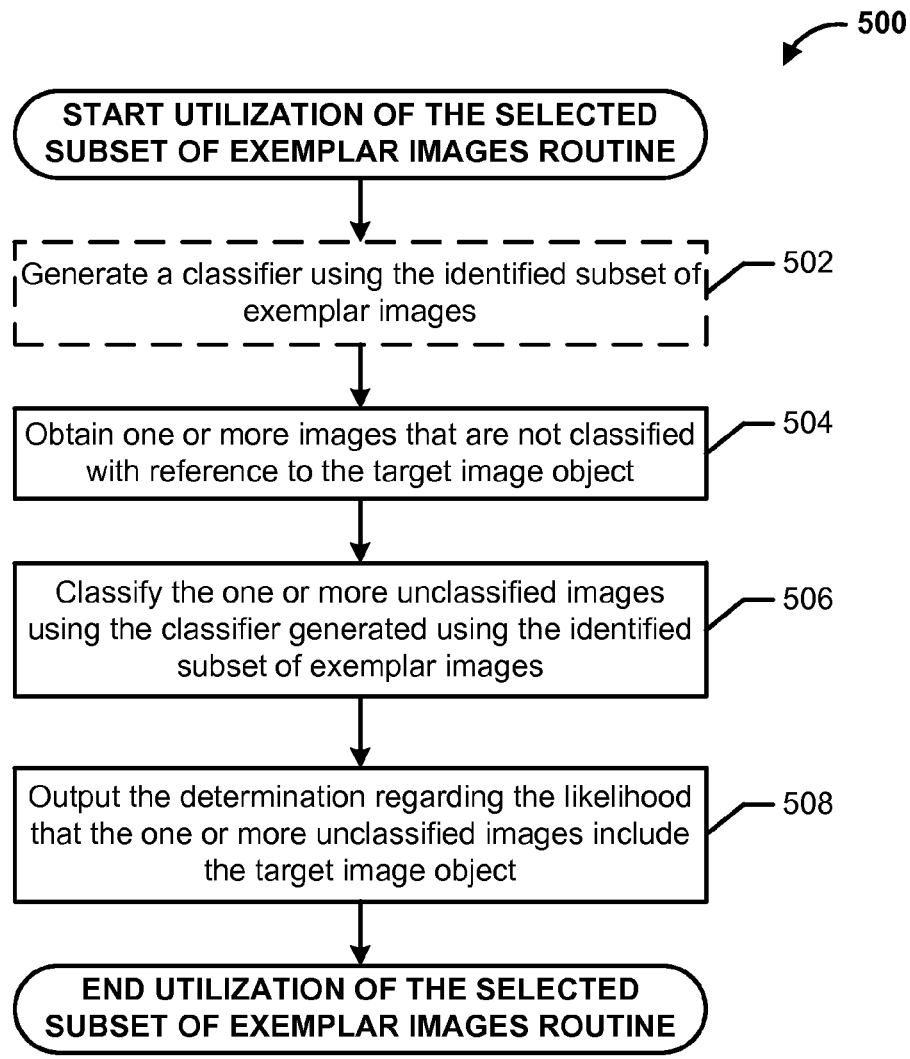
FIG. 5 is a process flow diagram illustrating a method for utilizing a classifier associated with desired performance characteristics, according to some embodiments.

FIG. 5 is a process flow diagram of an illustrative routine 500 for utilizing a classifier associated with desired performance characteristics, according to various embodiments. In some embodiments, the routine 500 may be implemented by a processor executing an image subset selector on a computing system (e.g., the image subset selector 320 of the computing system 302a as described with reference to FIG. 3).

As described above (e.g., with reference to FIGS. 4A-4B), the image subset selector 320 may identify a subset of exemplar images associated with a classifier having one or more desired performance characteristics. In some embodiments, subsequent to identifying the subset of exemplar images, the image subset selector 320 may optionally generate a classifier using that identified subset of exemplar images, in optional block 502. In such embodiments, the image subset selector 320 may not preserve or save each classifier that is generated while performing the operations in the routine 400, and as a result, the image subset selector 320 may recreate the classifier in optional block 502 in order to use that classifier to classify one or more unclassified images, as described further herein.

In block 504, the image subset selector 320 may obtain one or more images that are not classified with reference to the target image object that is included in each of the images in the identified subset of exemplar images. In some embodiments, the image subset selector 320 may retrieve the one or more unclassified images from local memory (e.g., the memory 314) or may obtain the one or more unclassified images from a remote computing system (e.g., the computing system 302b), an Internet data repository, a social network source and/or other source(s).

The image subset selector 320 may classify the one or more unclassified imaged obtained in block 504 using the classifier generated using the identified subset of exemplar images, in block 506. As described above, the image subset selector 320 may use the classifier to classify the one or more unclassified images by processing each image to determine image features (e.g., SIFT features) of the one or more images and applying these determined features to the classifier. The application of these features to the classifier results in a likelihood that the one or more unclassified images include the target image object. Further, because the classifier is generated using a subset of exemplar images previously determined to be best associated with one or more desired characteristics, the performance of the classifier (e.g., the accuracy and/or time efficiency of classifications of the one or more unclassified images) may conform to those one or more desired characteristics. For example, in the event that the identified subset of exemplar images is associated with a relatively short classification time with a relatively high true positive rate, the classifications generated in block 506 are likely to conform to those characteristics.

In block 508, the image subset selector 320 may output the classifications of the one or more unclassified images, which may indicate the images, if any, in the one or more unclassified images that include the target image object. For example, the image subset selector 320 may output a list or a visual indication of the images that include the target image object. The image subset selector 320 may then cease performing operations in the routine 500. It will be appreciated that output of the classification of the one or more images and subsequent actions taken by the computing system may vary depending on the purpose for which classification is being performed. For example, in some embodiments, the computing system may be configured to take action when the target image object does appear in a given analyzed image. For example, the computing system may be configured to crawl web sites or social network sources to identify images that include a given company's logo (which may be the target image object in this example) in order to report information to the company regarding the company's products appearing on third-party pages or repositories. In other embodiments, the computing system may be configured to take action when the target image object does not appear in a given analyzed image. For example, the computing system may be configured to place an advertisement either near or on the analyzed image within a page or user interface only in situations in which the analyzed image does not contain a competitor logo (which may be the target image object in this example).

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
    obtaining a set of exemplar images, wherein each of the set of exemplar images comprises a target image object and does not comprise a non-target image object;
    obtaining a set of false-alarm images, wherein each of the set of false-alarm images does not comprise the target image object;
    obtaining a set of recall images, wherein each of the set of recall images comprises the target image object and a non-target image object;
    determining a plurality of subsets from the set of exemplar images, wherein the plurality of subsets of exemplar images comprises every possible unique sub-combination of exemplar images from the set of exemplar images that includes at least one exemplar image;
    for each subset of exemplar images from the determined plurality of subsets:
        generating a classifier using the subset of exemplar images to train the classifier;
        using the classifier, classifying each image of the set of false-alarm images and classifying each image of the set of recall images; and
        generating performance statistics based on a classification of each image of the set of false-alarm images and a classification of each image of the set of recall images;
    obtaining at least one desired performance characteristic related to a classifier performance;
    ranking the performance statistics for each subset of exemplar images from the determined plurality of subsets based on the at least one desired performance characteristic;
    identify an optimal subset of exemplar images from the determined plurality of subsets based on the ranking of the performance statistics;
    obtaining an unclassified image that has not been previously classified with reference to the target image object;
    classifying the obtained unclassified image using a classifier generated using the identified optimal subset of the exemplar images; and
    outputting a classification of the obtained unclassified image.

2. The computer-implemented method of claim 1, wherein the target image object is one or more versions of a logo.

3. The computer-implemented method of claim 1, wherein the at least one desired performance characteristic comprises at least one of a threshold percentage of false positive identifications of the target image object in the set of false-alarm images, a threshold percentage of true positive identifications of the target image object in the set of recall images, a ratio of false positive identifications of the target image object in the set of false-alarm images to true positive identifications of the target image object in the set of recall images, or an amount of time required to generate a classifications of images in the set of recall images and in the set of false-alarm images.

4. A computing system comprising:
    a memory; and
    a processor in communication with the memory and configured with processor-executable instructions to perform operations comprising:
        obtaining a set of exemplar images that each depict a target image object;
        obtaining a set of recall images that each depict the target image object and depict a non-target image object;
        obtaining a set of false-alarm images that do not depict the target image object;
        determining two or more subsets of images of the set of exemplar images;
        for each subset of images of the two or more subsets of images:
            generating a classifier related to the target image object based on the subset of images; and
            using the classifier to generate performance statistics associated with the subset of images based on a respective classification of one or more images of the set of recall images and a respective classification of one or more images of the set of false-alarm images;
        obtaining one or more desired performance characteristics;
        selecting a preferred subset of images from the two or more subsets of images based on the one or more desired performance characteristics and performance statistics associated with at least the preferred subset of images; and
        generating a classification of an image using the preferred subset of images.

5. The computing system of claim 4, wherein the processor is configured with processor-executable instructions to perform operations such that generating a classifier related to the target image object based on the subset of images comprises:
    extracting at least one image feature for each image in the subset of images; and
    generating a composite classifier based on the at least one image feature for each image of the subset of images.

6. The computing system of claim 4, wherein the processor is configured with processor-executable instructions to perform operations such that obtaining a set of exemplar images that each depict a target image object further comprises obtaining an image from at least one of:
 a remote computing system via a network connection;
 an image repository attached locally to the computing system; or
 the memory.

7. The computing system of claim 4, wherein the processor is configured with processor-executable instructions to perform operations further comprising storing the statistics for each subset of the set of exemplar images.

8. The computing system of claim 4, wherein the processor is configured with processor-executable instructions to perform operations further comprising, subsequent to selecting the preferred subset of images:
 obtaining another desired characteristic other than the one or more desired performance characteristics;
 selecting another preferred subset of images from the set of exemplar images based on the another desired characteristic and performance statistics associated with the other preferred subset of images; and
 generating a classification of another image using the another preferred subset of images.

9. The computing system of claim 4, wherein:
 a number of images in the set of recall images is fixed when using different classifiers to generate performance statistics; and
 a number of images in the set of false-alarm images is fixed when using different classifiers to generate performance statistics.

10. The computing system of claim 4, wherein the processor is configured with processor-executable instructions to perform operations further comprising outputting the preferred subset of images to a user of the computing system.

11. The computing system of claim 4, wherein the desired characteristic comprises at least one of a threshold percentage of false positive identifications of the target image object in the set of false-alarm images, a threshold percentage of true positive identifications of the target image object in the set of recall images; a ratio of false positive identifications of the target image object in the set of false-alarm images to true positive identifications of the target image object in the set of recall images, or an amount of time required to generate a classifications of images in the set of recall images and in the set of false-alarm images.

12. A non-transitory, computer-readable medium having stored thereon computer-executable software instructions configured to cause a processor of a computing system to perform operations comprising:
 obtaining a set of exemplar images that each depict a target image object;
 obtaining a set of recall images that each depict the target image object and a non-target image object;
 obtaining a set of images false-alarm images that each do not depict the target image object;
 determining two or more subsets of images of the set of exemplar images;
 for each subset of images of the two or more subsets of images:
  generating a classifier related to the target image object based on the subset of images; and
  using the classifier to generate performance statistics associated with the subset of images based on a respective classification of each image of the set of recall images and a respective classification of each image of the set of false-alarm images;
 obtaining a first desired performance characteristic;
 selecting a preferred subset of images from the two or more subsets based on the first desired performance characteristic and performance statistics associated with the preferred subset of images;
 obtaining an image; and
 classifying the obtained image using the preferred subset of images.

13. The non-transitory computer-readable storage medium of claim 12, wherein the stored computer-executable software instructions are configured to cause a processor of the computing system to perform operations such that selecting a preferred subset of images from the two or more subsets based on the first desired performance characteristic and performance statistics associated with the preferred subset of images comprises:
 ranking performance statistics for each of the two or more subsets based on the first desired performance characteristic; and
 selecting the preferred subset of images from the two or more subsets, wherein the preferred subset of images is associated with performance statistics having a highest ranking.

14. The non-transitory computer-readable storage medium of claim 12, wherein the stored computer-executable software instructions are configured to cause a processor of the computing system to perform operations such that generating a classifier related to the target image object based on the subset of images comprises:
 extracting at least one image feature for each image in the subset of images;
 extracting at least one image feature for the target image object; and
 generating a composite classifier based on the at least one image feature for each image of the subset of images and based on the at least one image feature for the target image object.

15. The non-transitory computer-readable storage medium of claim 12, wherein the stored computer-executable software instructions are configured to cause a processor of the computing system to perform operations such that obtaining an image comprises obtaining the image from one of:
 a remote computing system via a network connection;
 an image repository locally attached to the computing system; or
 a memory of the computing system.

16. The non-transitory computer-readable storage medium of claim 12, wherein the processor is configured with processor-executable instructions to perform operations further comprising storing the statistics for each of the two or more subsets.

17. The non-transitory computer-readable storage medium of claim 12, wherein the stored computer-executable software instructions are configured to cause a processor of the computing system to perform operations further comprising, subsequent to selecting the preferred subset of images from the two or more subsets:
 obtaining at least one additional desired characteristic, wherein the at least one additional desired characteristic is distinct from the first desired characteristic;
 selecting another preferred subset of images from the two or more subsets based on the at least one additional desired characteristic and statistics associated with the other preferred subset of images;
 obtaining another image; and generating a classification of the other obtained image using the other preferred subset of images.

18. The non-transitory computer-readable storage medium of claim 12, wherein the stored computer-executable software instructions are configured to cause a processor of the computing system to perform operations further comprising outputting the preferred subset of images to a user of the computing system.

19. The non-transitory computer-readable storage medium of claim 12, wherein the first desired characteristic comprises at least one of a threshold percentage of false positive identifications of the target image object in the set of false-alarm images, a threshold percentage of true positive identifications of the target image object in the set of recall images; a ratio of false positive identifications of the target image object in the set of false-alarm images to true positive identifications of the target image object in the set of recall images, an amount of time required to generate a classifications of images in the set of recall images and in the set of false-alarm images, or a number of image features in an image.

20. The non-transitory computer-readable storage medium of claim 12, wherein the stored computer-executable software instructions are configured to cause a processor of the computing system to perform operations such that obtaining a set of exemplar images that each depict a target image object further comprises performing at least one of a plurality of operations on at least one image of the set of exemplar images, wherein the plurality of operations comprises a low-pass filter operation, a high-pass filter operation, a band-pass filter operation, a color-space-transformation operation, an affine transformation operation, a projective transformation operation, a resizing operation, and a cropping operation.

* * * * *